United States Patent
Chen et al.

(10) Patent No.: US 12,491,491 B2
(45) Date of Patent: Dec. 9, 2025

(54) FILLING MATERIAL, METHOD FOR PREPARING SAME AND METHOD FOR PREPARING ELECTROLYTIC COPPER FOIL FOR HIGH-FREQUENCY SIGNAL TRANSMISSION

(71) Applicants: JIANGSU MINGFENG ELECTRONIC MATERIALS CO., LTD, Changzhou (CN); CHANGZHOU UNIVERSITY, Changzhou (CN)

(72) Inventors: Zhidong Chen, Changzhou (CN); Qianying Cao, Changzhou (CN); Wenchang Wang, Changzhou (CN); Minxian Wu, Changzhou (CN); Xiaoqiang Ming, Changzhou (CN); Pengju Wang, Changzhou (CN)

(73) Assignees: JIANGSU MINGFENG ELECTRONIC MATERIALS CO., LTD, Changzhou (CN); CHANGZHOU UNIVERSITY, Changzhou (CN)

( * ) Notice: Subject to any disclaimer, the term of this patent is extended or adjusted under 35 U.S.C. 154(b) by 451 days.

(21) Appl. No.: 18/023,361

(22) PCT Filed: May 18, 2022

(86) PCT No.: PCT/CN2022/093416
§ 371 (c)(1),
(2) Date: Feb. 26, 2023

(87) PCT Pub. No.: WO2022/247694
PCT Pub. Date: Dec. 1, 2022

(65) Prior Publication Data
US 2023/0330625 A1    Oct. 19, 2023

(30) Foreign Application Priority Data

May 24, 2021 (CN) .......................... 202110565990.3

(51) Int. Cl.
*B01J 20/22* (2006.01)
*B01J 20/30* (2006.01)
(Continued)

(52) U.S. Cl.
CPC ......... *B01J 20/226* (2013.01); *B01J 20/3071* (2013.01); *B01J 20/3078* (2013.01);
(Continued)

(58) Field of Classification Search
None
See application file for complete search history.

(56) References Cited

U.S. PATENT DOCUMENTS 8,137,525 B1    3/2012  Harreld et al.
2009/0269511 A1  10/2009 Zhamu et al.

FOREIGN PATENT DOCUMENTS

| CN | 1640216 A | 7/2005 |
| CN | 103214689 A | 7/2013 |

(Continued)

OTHER PUBLICATIONS

Gong Mengting, et al., Preparation, characterization and adsorption property for a metal organic frames (MOFs)-molecularly imprinted polymer (MIPs) composite material, Properties for Morpholine, 2020, pp. 05193-05201, vol. 51, No. 5.

*Primary Examiner* — Daniel Berns
(74) *Attorney, Agent, or Firm* — Bayramoglu Law Offices LLC

(57) ABSTRACT

A method for preparing a filling material includes: dissolving $FeCl_3 \cdot 6H_2O$ and an imprinted molecule in water to form a reaction solution; adding DMF to the reaction solution and
(Continued)

stirring for dissolution; adding BDC to the reaction solution and stirring for dissolution; soaking PC into the reaction solution and stirring; and treating the reaction solution by a hydrothermal method to remove a molecule of an additive decomposition product and prepare the filling material imprinted with a casting structure of the molecule of additive decomposition product. The present invention can effectively and selectively adsorb the additive decomposition products and achieve the effects of effectively removing the additive decomposition products, preventing the decomposition products from being mixed in an electrodeposition film of the copper, realizing the uniform distribution of current on the cathode and the anode, improving the quality and preparing an electrolytic copper foil for high-frequency signal transmission.

8 Claims, 1 Drawing Sheet

(51) Int. Cl.
*B01J 20/32* (2006.01)
*C25C 1/12* (2006.01)
*C25C 7/02* (2006.01)
*C25D 1/04* (2006.01)
*H04B 3/02* (2006.01)
*H05K 1/02* (2006.01)

(52) U.S. Cl.
CPC ....... *B01J 20/3092* (2013.01); *B01J 20/3204* (2013.01); *C25C 1/12* (2013.01); *C25C 7/02* (2013.01)

(56) References Cited

FOREIGN PATENT DOCUMENTS

| | | |
|---|---|---|
| CN | 104479072 A | 4/2015 |
| CN | 105753727 A | 7/2016 |
| CN | 107913682 A | 4/2018 |
| CN | 108855008 A | 11/2018 |
| CN | 109402678 A | 3/2019 |
| CN | 110479220 A | 11/2019 |
| CN | 110997983 A | 4/2020 |
| CN | 111074317 A | 4/2020 |
| CN | 112387250 A | 2/2021 |
| CN | 112543822 A | 3/2021 |
| CN | 113337855 A | 9/2021 |
| CN | 113354445 A | 9/2021 |
| KR | 20190009048 A | 1/2019 |
| KR | 20190043275 A | 4/2019 |
| WO | 2008030179 A1 | 3/2008 |
| WO | 2021007987 A1 | 1/2021 |

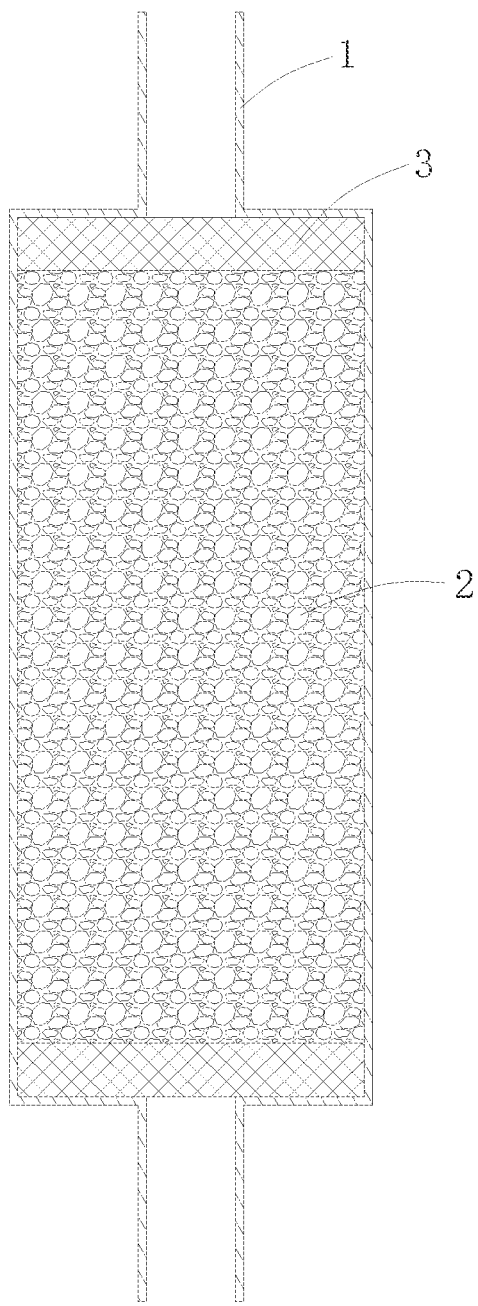

FILLING MATERIAL, METHOD FOR PREPARING SAME AND METHOD FOR PREPARING ELECTROLYTIC COPPER FOIL FOR HIGH-FREQUENCY SIGNAL TRANSMISSION

CROSS REFERENCE TO THE RELATED APPLICATIONS

This application is the national phase entry of International Application No. PCT/CN2022/093416, filed on May 18, 2022, which is based upon and claims priority to Chinese Patent Application No. 202110565990.3, filed on May 24, 2021, the entire contents of which are incorporated herein by reference.

TECHNICAL FIELD

The present invention relates to the technical field of additive decomposition products, and particularly relates to a filling material, a method for preparing the same, and a method for preparing an electrolytic copper foil for high-frequency signal transmission.

BACKGROUND

Copper foil is one of the most important raw materials in the manufacture of printed circuit boards (PCBs) as a carrier of electronic and signal conduction channels in circuit boards. With the rise of 5G, the "skin effect" of a high-frequency signal generated on the surface of a copper foil of a transmission line is more and more significant with the increase in the frequency of a transmission signal. When the transmission signal is 5G, the transmission thickness of the signal on the surface of a wire is about 0.93 μm; that is, the signal transmission is only performed within the thickness range of roughness, so that serious "standing waves", "reflections", etc., of signals are inevitably generated, causing signal loss and even serious or complete distortion. The rougher the surface of the copper foil is, the higher the signal loss. Accordingly, with the popularization of 5G technology and the continuous development of the signal transmission to high frequency, low-profile electrolytic copper foils with low surface roughness suitable for high-frequency PCBs have been attracting attention.

In order to prepare low-profile electrolytic copper foils, additives (brighteners and leveling agents) need to be added to the copper electrodeposition solution. However, as copper electrodeposition proceeds, some additives will be oxidized and decomposed. In addition, the general electrodeposition temperature is higher than 50° C. At this temperature, it is inevitable that some of additives are oxidized and decomposed after passing through a cell body of a foil manufacturing machine. The additive decomposition products are not only unhelpful for the electrodeposition of copper, but also will be mixed into the deposition layer of copper with the proceeding of electrodeposition of copper, thereby affecting the quality of the electrolytic copper foil, such as reducing the ductility and tensile strength of the copper foil, and the like. Thus the additive decomposition products must be removed in time. Therefore, in the current process, activated carbons are added to a pipeline during the circulation process of the electrolyte solution so as to remove the additive decomposition products. However, the activated carbons are not selective for the removal of organics, and the activated carbons remove not only the additive decomposition products but also the additives, thereby causing a large amount of waste of the additives and the activated carbons.

SUMMARY

The present invention is intended to provide a filling material, a method for preparing the same, and a method for preparing an electrolytic copper foil for high-frequency signal transmission, so as to solve the technical problem of removing additive decomposition products in a copper electrolyte solution to improve the ductility of the electrolytic copper foil and reduce the roughness of the copper foil in the manufacturing process of the electrolytic copper foil for high-frequency signal transmission.

In order to solve the technical problem described above, the present invention provides a filling material, which comprises the following raw materials:
$FeCl_3 \cdot 6H_2O$: 3 g;
an imprinted molecule: 0.15-3 g;
N',N-dimethylformamide (DMF): 60 g;
2-aminoterephthalic acid (BDC): 1 g; and
a porous ceramic (PC): 6-30 g.

In another aspect, the present invention also provides a method for preparing the filling material, which comprises:
step S01: dissolving ferric chloride hexahydrate ($FeCl_3 \cdot 6H_2O$) and an imprinted molecule in water to form a reaction solution;
step S02: adding N',N-dimethylformamide (DMF) to the reaction solution and stirring for dissolution;
step S03: adding 2-aminoterephthalic acid (BDC) to the reaction solution and stirring for dissolution;
step S04: soaking a porous ceramic (PC) into the reaction solution and stirring; and
step S05: treating the reaction solution by a hydrothermal method to remove a molecule of an additive decomposition product and prepare the crystal-like filling material imprinted with a casting structure of the molecule of the additive decomposition product (MI-Fe-MOFs/PC).

Further, the step S05 comprises:
step S05.1: pouring the reaction solution stirred in the step S04 into a polytetrafluoroethylene-lined bottle, transferring the reaction solution into a reactor, and placing the reactor in a blast air oven for reaction;
step S05.2: cooling the reaction solution after the reaction is completed, taking out the reaction solution for centrifugation, discarding the supernatant and collecting a product;
step S05.3: performing a primary washing of the product with DMF to remove an uncoordinated reaction precursor;
step S05.4: performing a secondary washing of the product with methanol to remove an imprinted molecule, an additive decomposition product, in the product; and
step S05.5: centrifuging and collecting the product after two washings, and drying the product under vacuum to obtain the filling material imprinted with the casting structure of the molecule of the additive decomposition product (MI-Fe-MOFs/PC).

Further, the mass percentage concentration of BDC, $FeCl_3 \cdot 6H_2O$, DMF and $H_2O$ in the preparation process of the filling material (MI-Fe-MOFs/PC) is:
BDC:$FeCl_3 \cdot 6H_2O$:DMF:$H_2O$=1:3:60:200.

Further, a method for preparing the imprinted molecule comprises:
preparing a mixed solution containing an additive and concentrated sulfuric acid;

placing two pieces of materials not participating in the electrolysis reaction as an anode and a cathode in the mixed solution;

electrolyzing the mixed solution; and neutralizing the electrolyzed solution with NaOH solution, and extracting with an organic solvent acetone to obtain the imprinted molecule.

Further, the porous ceramic (PC) is one of an alumina porous ceramic, a zirconia porous ceramic and an aluminum nitride porous ceramic.

Further, the porous ceramic (PC) has a particle size of more than 100 μm and less than 1000 μm.

In a third aspect, the present invention further provides a method for preparing an electrolytic copper foil for high-frequency signal transmission, which comprises:

connecting an additive decomposition product adsorption column with an electrolytic cell; and filtering a copper electrolyte solution in the electrolytic cell by using the additive decomposition product adsorption column to remove an additive decomposition product in the copper electrolyte solution and retain the additive, so as to prepare the electrolytic copper foil for high-frequency signal transmission.

Further, the additive decomposition product adsorption column comprises:

a glass tube to contain a filling material (MI-Fe-MOFs/PC); and two pieces of mesh nylon, both set in the glass tube to plug two ends of the filling material (MI-Fe-MOFs/PC);

the filling material (MI-Fe-MOFs/PC) is prepared by the method described above.

The present invention has the following beneficial effects: with regard to the filling material, the method for preparing the same and the method for preparing the electrolytic copper foil for high-frequency signal transmission of the present invention, the imprinted molecule, the filling material and the additive decomposition product adsorption column are prepared to completely adsorb and process the decomposed products of the additive in the copper electrodeposition solution; even in the presence of strong acid and a large amount of copper ions, the additive decomposition products can also be effectively and selectively adsorbed, so that the effects of effectively removing the additive decomposition products, preventing these decomposition products from being mixed in an electrodeposition film of the copper, realizing the uniform distribution of current on the cathode and the anode, improving the quality of the electrolytic copper foil and preparing the electrolytic copper foil for high-frequency signal transmission are achieved.

Other features and advantages of the present invention will be set forth in the specification below, and will be partly apparent from the specification or may be understood by implementing the present invention.

In order to make the aforementioned objects, features and advantages of the present invention comprehensible, preferred embodiments with reference to the attached drawing are described in detail below.

BRIEF DESCRIPTION OF THE DRAWINGS

In order to more clearly illustrate the technical schemes in the embodiments of the present invention or in the prior art, the drawings required to be used in the description of the embodiments or the prior art are briefly introduced below. The drawings in the description are some embodiments of the present invention, and those of ordinary skill in the art can obtain other drawings according to these drawings without creative efforts.

FIGURE is a schematic structural diagram of an additive decomposition product adsorption column according to a preferred embodiment of the present invention.

In the FIGURE:

1 represents a glass tube, 2 represents a filling material, and 3 represents a mesh nylon.

DETAILED DESCRIPTION OF THE EMBODIMENTS

In order to make the objects, technical schemes and advantages of the embodiments of the present invention more apparent, the technical schemes of the present invention will be clearly and completely described below with reference to the drawing, and it is obvious that the described embodiments are only a part of the embodiments of the present invention but not all of them. Based on the embodiments of the present invention, all other embodiments obtained by those of ordinary skill in the art without creative effort shall fall within the protection scope of the present invention.

Example 1

A filling material of this example comprises the following raw materials:

$FeCl_3 \cdot 6H_2O$: 3 g; an imprinted molecule: 0.15-3 g; N',N-dimethylformamide (DMF): 60 g; 2-aminoterephthalic acid (BDC): 1 g; a porous ceramic (PC): 6-30 g.

Example 2

A method for preparing the filling material of this example comprises:

step S01: dissolving ferric chloride hexahydrate ($FeCl_3 \cdot 6H_2O$) and an imprinted molecule in water to form a reaction solution;

step S02: adding N',N-dimethylformamide (DMF) to the reaction solution and stirring for dissolution;

step S03: adding 2-aminoterephthalic acid (BDC) to the reaction solution and stirring for dissolution;

step S04: soaking a porous ceramic (PC) into the reaction solution and stirring; and step S05: treating the reaction solution by a hydrothermal method to remove a molecule of an additive decomposition product and prepare the crystal-like filling material imprinted with a casting structure of the molecule of the additive decomposition product (MI-Fe-MOFs/PC).

In this example, step S05 comprises:

step S05.1: pouring the reaction solution stirred in the step S04 into a polytetrafluoroethylene-lined bottle, transferring the reaction solution into a reactor, and placing the reactor in a blast air oven for reaction;

step S05.2: cooling the reaction solution after the reaction is completed, taking out the reaction solution for centrifugation, discarding the supernatant and collecting a product;

step S05.3: performing a primary washing of the product with DMF to remove an uncoordinated reaction precursor;

step S05.4: performing a secondary washing of the product with methanol to remove an imprinted molecule, an additive decomposition product, in the product; and step S05.5: centrifuging and collecting the product after two washings, and drying the product under vacuum to obtain the filling material imprinted with the casting structure of the molecule of the additive decomposition product (MI-Fe-MOFs/PC).

In this example, the filling material (MI-Fe-MOFs/PC) is composed of two parts, i.e., MI-Fe-MOFs with a casting structure of a molecule of the additive molecule decomposition product and a support ceramic material (PC) of MI-Fe-MOFs. The basic composition of organic framework Fe-MOFs with iron as the central ion is $FeCl_3 \cdot 6H_2O$, DMF, BDC and a reaction solvent $H_2O$. The mass percentage concentration of BDC, $FeCl_3 \cdot 6H_2O$, DMF and $H_2O$ in the preparation process of the filling material (MI-Fe-MOFs/PC) is: $BDC:FeCl_3 \cdot 6H_2O:DMF:H_2O=1:3:60:200$.

When the imprinted molecules are added to the organic framework Fe-MOFs and then eluted, the MI-Fe-MOFs with the casting structure of a template molecule can be obtained. Generally, the amount of the imprinted molecules used is 0.1-1 times that of ferric salts. If no imprinted molecules are added during the preparation of MI-Fe-MOFs, the Fe-MOFs without the casting structure of the imprinted molecules is prepared by the synthesis. When the amount of the imprinted molecules used is less than 0.1 times, there are not many casting structures of the imprinted molecules in the MI-Fe-MOFs material since the concentration of the imprinted molecules is too low, which affects the following adsorption capacity on the additive decomposition products. When the amount of the imprinted molecules used is more than 1 time higher than that of the ferric salts, the imprinted molecules are wasted. Therefore, the optimal amount of the imprinted molecules used is usually about 0.3 times the amount of the ferric salts.

In order to enable the electrolyte solution to smoothly pass through an adsorption column prepared with the MI-Fe-MOFs and achieve the purpose of removing the additive decomposition products in the copper foil electrolyte solution, loading the MI-Fe-MOFs on large-particle porous ceramics (PCs) is a very effective method. The amount of the PCs added in the preparation of the MI-Fe-MOFs synthetic solution is usually 0.5-10 times the amount of the ferric salts. When the amount of the PCs added is too small and is less than 0.5 times the amount of the ferric salts, the MI-Fe-MOFs film loaded on the surface of the PCs is too thick, so that the adsorption efficiency for the additive decomposition products is reduced; and conversely, when the amount of the PCs added is too large and is more than 10 times the amount of the ferric salts, the MI-Fe-MOFs film on the surface of the PCs is too thin, so that the adsorption capacity on the additive decomposition products is also reduced. Generally, the optimal amount of the PCs added is about 5 times the amount of the ferric salts.

In this example, a method for preparing the imprinted molecule comprises:

preparing a mixed solution containing an additive and concentrated sulfuric acid; placing two pieces of materials not participating in the electrolysis reaction as an anode and a cathode in the mixed solution; using an electrochemical method to prepare the imprinted molecule; wherein materials which do not participate in electrolysis reaction can be used as the cathode and anode, such as gold, platinum, carbon, titanium electrodes and the like, and the electrolytic conditions such as current density and electrolytic temperature are consistent with the conditions for preparing the electrolytic copper foil; electrolyzing the mixed solution; neutralizing the electrolyzed solution with NaOH solution, and extracting with an organic solvent acetone to obtain the imprinted molecule. Specifically, a mixed solution containing 50 mL/L additive and 100 mL/L concentrated sulfuric acid is prepared, two titanium plates as an anode and a cathode are placed in the mixed solution, and the electrolysis generally lasts for 6-12 h at a temperature of 50° C. and a current density of 70 $A/dm^2$. The electrolysis time for preparing the imprinted molecules by using the electrochemical method is a time required for completely decomposing the additives, and is generally 12 h at the current density for preparing the electrolytic copper foil. As for the electrolysis conditions for preparing the imprinted molecules, the current density and temperature should be the operating conditions for preparing the electrolytic copper foil so as to obtain the same additive decomposition products. The electrolysis time is a time for completely decomposing the additive in the electrolyte solution, and whether the additive is completely decomposed or not can be determined by using liquid chromatography analysis. Generally, the electrolysis time is 6-12 h. If the electrolysis time is too short, the additive decomposition products are too little, the concentration of the imprinted molecules is too low, and a large number of additive molecules exist at the same time, thereby affecting the molecular imprinting in the next step. Conversely, if the electrolysis time is too long, there is a waste of time. The electrolyte solution is neutralized with NaOH solution, and extracted with organic solvent acetone to obtain molecules of the additive decomposition products, i.e. imprinted molecules.

In this example, the porous ceramic (PC) is one of an alumina porous ceramic, a zirconia porous ceramic and an aluminum nitride porous ceramic. Of course, the porous ceramic (PC) can also be selected from other materials, as long as the porous ceramic (PC) has acid resistance.

In this example, the porous ceramic (PC) has a particle size of more than 100 μm and less than 1000 μm. If the particle size of the porous ceramic (PC) is too small, the flow resistance of the prepared filling material (MI-Fe-MOFs/PC) is too large, thereby affecting the flow of the copper electrolyte solution; if the particle size of the porous ceramic (PC) is too large, the adsorption effect for the additive decomposition products is reduced due to the rapid flow of the copper electrolyte solution.

In this example, the specific method for preparing the filling material (MI-Fe-MOFs/PC) is described in Example 2.1 to Example 2.9, Comparative Example 1 and Comparative Example 2 below. The ratios of raw materials for the nine examples are listed below (see Table 1).

Example 2.1

The method for preparing the filling material (MI-Fe-MOFs/PC) is as follows:

3 g of $FeCl_3 \cdot 6H_2O$ and 0.15 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 15 g of porous ceramic (PC). The solution was fully stirred for 1 h.

The uniformly mixed solution was poured into a 500 mL polytetrafluoroethylene-lined bottle, and then transferred into a 500 mL stainless steel reactor, and the reactor was placed in a blast air oven to react at 120° C. for 24 h. After the reaction was completed, the reaction solution was naturally cooled to room temperature, taken out and centrifuged at 3000 rpm for 10 min, the supernatant was discarded, and a product was collected. The product was first washed three times with DMF to remove uncoordinated reaction precursors. Then, the product was washed two times with about 50 mL of methanol under stirring for about 12 h each time. The purpose was to remove the imprinted molecules, the additive decomposition products, from the filling material sufficiently. Then, the product after washing was centrifuged and collected, and dried under vacuum at 60° C. for 12 h to obtain the filling material imprinted with the casting structure of the molecule of the additive decomposition products (MI-Fe-MOFs/PC).

Example 2.2

The method for preparing the filling material (MI-Fe-MOFs/PC) is as follows:

3 g of $FeCl_3 \cdot 6H_2O$ and 0.2 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 15 g of porous ceramic (PC). The solution was fully stirred for 1 h.

The subsequent operation steps are the same as those in Example 2.1, and are not described herein again.

Example 2.3

The method for preparing the filling material (MI-Fe-MOFs/PC) is as follows:

3 g of $FeCl_3 \cdot 6H_2O$ and 0.9 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 15 g of porous ceramic (PC). The solution was fully stirred for 1 h.

The subsequent operation steps are the same as those in Example 2.1, and are not described herein again.

Example 2.4

The method for preparing the filling material (MI-Fe-MOFs/PC) is as follows:

3 g of $FeCl_3 \cdot 6H_2O$ and 2.4 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 15 g of porous ceramic (PC). The solution was fully stirred for 1 h.

The subsequent operation steps are the same as those in Example 2.1, and are not described herein again.

Example 2.5

The method for preparing the filling material (MI-Fe-MOFs/PC) is as follows:

3 g of $FeCl_3 \cdot 6H_2O$ and 3 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 15 g of porous ceramic (PC). The solution was fully stirred for 1 h.

The subsequent operation steps are the same as those in Example 2.1, and are not described herein again.

Example 2.6

The method for preparing the filling material (MI-Fe-MOFs/PC) is as follows:

3 g of $FeCl_3 \cdot 6H_2O$ and 0.9 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 1.5 g of porous ceramic (PC). The solution was fully stirred for 1 h.

The subsequent operation steps are the same as those in Example 2.1, and are not described herein again.

Example 2.7

The method for preparing the filling material (MI-Fe-MOFs/PC) is as follows:

3 g of $FeCl_3 \cdot 6H_2O$ and 0.9 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 6 g of porous ceramic (PC). The solution was fully stirred for 1 h.

The subsequent operation steps are the same as those in Example 2.1, and are not described herein again.

Example 2.8

The method for preparing the filling material (MI-Fe-MOFs/PC) is as follows:

3 g of $FeCl_3 \cdot 6H_2O$ and 0.9 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 24 g of porous ceramic (PC). The solution was fully stirred for 1 h.

The subsequent operation steps are the same as those in Example 2.1, and are not described herein again.

Example 2.9

The method for preparing the filling material (MI-Fe-MOFs/PC) is as follows:

3 g of $FeCl_3 \cdot 6H_2O$ and 0.9 g of imprinted molecules were taken and dissolved in 200 g of water, 60 g of N',N-dimethylformamide (DMF) was added and stirred for complete dissolution, and then 1 g of 2-aminoterephthalic acid (BDC) was added to the solution and stirred for dissolution, followed by addition of 30 g of porous ceramic (PC). The solution was fully stirred for 1 h.

The subsequent operation steps are the same as those in Example 2.1, and are not described herein again.

Comparative Example 1

The method for preparing the filling material (MI-Fe-MOFs/PC) is as follows:

3 g of $FeCl_3 \cdot 6H_2O$ and 0 g of imprinted molecules were taken and dissolved in 200 g of water, 60 g of N',N- dimethylformamide (DMF) was added and stirred for complete dissolution, and then 1 g of 2-aminoterephthalic acid (BDC) was added to the solution and stirred for dissolution, followed by addition of 15 g of porous ceramic (PC). The solution was fully stirred for 1 h.

The subsequent operation steps are the same as those in Example 2.1, and are not described herein again.

Comparative Example 2

The method for preparing the filling material (MI-Fe-MOFs/PC) is as follows:

3 g of $FeCl_3 \cdot 6H_2O$ and 0.9 g of imprinted molecules were taken and dissolved in 200 g of water, 60 g of N',N-dimethylformamide (DMF) was added and stirred for complete dissolution, and then 1 g of 2-aminoterephthalic acid was added to the solution and stirred for dissolution, followed by addition of 0 g of porous ceramic (PC). The solution was fully stirred for 1 h.

The subsequent operation steps are the same as those in Example 2.1, and are not described herein again.

Example 3

The method for preparing the electrolytic copper foil for high-frequency signal transmission of this example comprises:

connecting an additive decomposition product adsorption column with an electrolytic cell; and filtering a copper electrolyte solution in the electrolytic cell by using the additive decomposition product adsorption column to remove an additive decomposition product in the copper electrolyte solution and retain the additive, so as to prepare the electrolytic copper foil for high-frequency signal transmission. The adsorption column was connected with the electrolytic cell for the electrolytic copper foil, and the electrolyte solution was passed through the MI-Fe-MOFs/PC adsorption column and continuously circulated, so that the additive decomposition products in the copper electrolyte solution were removed.

In this example, in order to simplify the experiment, the actual environment for producing the electrolytic copper foil was simulated, and in this system, if the additive decomposition products in the electrolyte solution could be effectively removed, the additive decomposition products could be effectively removed in the electrolytic copper foil production process in the actual production. The copper electrolyte solution was passed through the MI-Fe-MOFs/PC adsorption column by a peristaltic pump at a flow rate of 100 mL/min, and the MI-Fe-MOFs/PC adsorption column had an internal volume of about 10 mL. The content of the additive decomposition products before and after the copper foil electrolyte solution was passed through the MI-Fe-MOFs/PC adsorption column was each determined, wherein the additive decomposition products were determined by using liquid chromatography.

The simulated solution was prepared by dissolving copper sulfate in a sulfuric acid solution such that the concentration of the copper sulfate was 300 g/L and the concentration of the sulfuric acid was 100 g/L. The additive was added in an amount specified by each company. Since the additives were different for each company, the additive decomposition products were also different. In the examples of the present invention, additives of two companies were selected as representatives, and denoted as A and B, respectively. In order to simplify the quantitative analysis operation, the analysis was carried out by using liquid chromatography, and the chromatographic peak area of the additive decomposition products in the copper electrolyte solution that had not been treated by the MI-Fe-MOFs/PC column was counted as 100. After treatment by the MI-Fe-MOFs/PC adsorption column, the concentration of the additive decomposition products was calculated proportionally with the decrease of the peak area. If the additive decomposition products did not show a peak in the chromatographic analysis after being treated by the MI-Fe-MOFs/PC adsorption column, the additive decomposition products were not detected and marked as 0. The above specific Example 2.1 to Example 2.9, Comparative Example 1 and Comparative Example 2 are specific methods for preparing the filling materials (MI-Fe-MOFs/PC) of the present application, but the reaction conditions and the concentrations of the raw materials are not limited to those listed in the above examples and comparative examples. The changes in concentrations of the additive decomposition products before and after A and B is treated by the MI-Fe-MOFs/PC adsorption column are shown in Table 2.

As shown in FIGURE, in this example, the additive decomposition product adsorption column comprises:

a glass tube 1 containing a filling material 2 (MI-Fe-MOFs/PC); and two pieces of mesh nylon 3 set in the glass tube 1 and used for plugging two ends of the filling material 2 (MI-Fe-MOFs/PC), wherein the filling material 2 (MI-Fe-MOFs/PC) is prepared as described above. In this example, porous ceramic (PC) powder loaded with MI-Fe-MOFs imprinted with molecules of the additive decomposition product was used as the filling material 2 (MI-Fe-MOFs/PC). The adsorption column prepared by the filling material 2 (MI-Fe-MOFs/PC) had a good capacity in selectively removing the additive decomposition products, and the additives of the electrolytic copper solution were not removed. Therefore, the additive decomposition products in the electrolytic copper foil production process can be selectively removed without removing the additives. Of course, alternatively, the glass tube 1 filled with the filling material 2 (MI-Fe-MOFs/PC) could be replaced by a stainless steel tube.

TABLE 1

The ratios of raw materials in Example 2.1 to Example 2.9 of the present application

| Examples | FeCl3•6H2O | Imprinted molecules | DMF | 2-amino-terephthalic acid | PC |
| --- | --- | --- | --- | --- | --- |
| Example 2.1 | 3 g | 0.15 g | 60 g | 1 g | 15 g |
| Example 2.2 | 3 g | 0.2 g | 60 g | 1 g | 15 g |
| Example 2.3 | 3 g | 0.9 g | 60 g | 1 g | 15 g |
| Example 2.4 | 3 g | 2.4 g | 60 g | 1 g | 15 g |
| Example 2.5 | 3 g | 3 g | 60 g | 1 g | 15 g |
| Example 2.6 | 3 g | 0.9 g | 60 g | 1 g | 15 g |
| Example 2.7 | 3 g | 0.9 g | 60 g | 1 g | 6 g |
| Example 2.8 | 3 g | 0.9 g | 60 g | 1 g | 24 g |
| Example 2.9 | 3 g | 0.9 g | 60 g | 1 g | 30 g |

TABLE 2

Changes in concentrations of the additive decomposition products before and after being treated by the MI-Fe-MOFs/PC adsorption columns in Example 2.1 to Example 2.9 and Comparative Example 1 and Comparative Example 2

| Examples | Additive from company A without adsorption treatment by the filling column | Additive from company B without adsorption treatment by the filling column | Additive from company A with adsorption treatment by the filling column | Additive from company B with adsorption treatment by the filling column |
|---|---|---|---|---|
| Example 2.1 | 100 | 100 | 15.2 | 16.1 |
| Example 2.2 | 100 | 100 | 6.4 | 5.8 |
| Example 2.3 | 100 | 100 | 0 | 0 |
| Example 2.4 | 100 | 100 | 0 | 0 |
| Example 2.5 | 100 | 100 | 0 | 0 |
| Example 2.6 | 100 | 100 | 1.9 | 2.6 |
| Example 2.7 | 100 | 100 | 0 | 0 |
| Example 2.8 | 100 | 100 | 0 | 0 |
| Example 2.9 | 100 | 100 | 3.9 | 5.2 |
| Comparative Example 1 | 100 | 100 | 98.5 | 99.0 |
| Comparative Example 2 | 100 | 100 | 0 | 0 |

It can be seen from Example 2.1 to Example 2.9 in Table 1 and Table 2 that the MI-Fe-MOFs/PC adsorption column is very effective in removing the additive decomposition products in the copper electrolyte solution; in addition, it can be seen from the results of Comparative Example 1 and Comparative Example 2 in Table 2 that the Fe-MOFs/PC adsorption columns which are not imprinted with molecules of the additive decomposition products hardly adsorb the additive decomposition products.

In summary, the filling material, the method for preparing the same and the method for preparing the electrolytic copper foil for high-frequency signal transmission of the present invention are used, wherein the organic additive decomposition products in the copper electrolyte solution are used as template molecules, ferric chloride hexahydrate ($FeCl_3 \cdot 6H_2O$), N',N-dimethylformamide (DMF), 2-aminoterephthalic acid (BDC) and porous ceramic (PC) are used as raw materials, and the Fe-MOFs material imprinted with the casting structure of molecules of the additive decomposition products is prepared and marked as MI-Fe-MOFs. The MI-Fe-MOFs are filled in a glass tube to prepare an additive decomposition product adsorption column, which is used for adsorbing the additive decomposition products in the copper electrolyte solution. The adsorption column has a good capacity in removing the additive decomposition products in the copper electrolyte solution, and can fully adsorb and treat the decomposed products of the additives in the copper electrodeposition solution, thereby preventing these decomposition products from being mixed in an electrodeposition film of the copper, realizing the uniform distribution of current on the cathode and the anode, improving the quality of the electrolytic copper foil and thereby preparing an electrolytic copper foil for high-frequency signal transmission.

The present invention provides a method for selectively removing additive decomposition products in the electrolytic copper foil production process without influencing the additives. Porous ceramic (PC) powder loaded with MI-Fe-MOFs imprinted with the casting structure of the molecule of the additive decomposition product is used as the filling material (MI-Fe-MOFs/PC). The adsorption column prepared by the filling material (MI-Fe-MOFs/PC) has a good capacity in selectively removing the additive decomposition products, and the additives of the electrolytic copper solution are not removed, so that the concentration of the additive decomposition products in the copper electrolyte solution is reduced and the ductility of the low-profile electrolytic copper foil is increased.

The components (components without specific structures) selected in the present application are all common standard components or components known to those skilled in the art, and the structures and principles thereof can be known to those skilled in the art through technical manuals or through conventional experimental methods.

In the description of examples of the present invention, unless otherwise clearly specified and defined, the terms "mount", "interconnect" and "connect" should be understood in their broad sense. For example, "connect" may be "fixedly connect", "detachably connect" or "integrally connect"; "mechanically connect" and "electrically connect"; or "directly interconnect", "indirectly interconnect through an intermediate" or "the communication between the interiors of two elements". For those of ordinary skill in the art, the specific meanings of the aforementioned terms in the present invention can be understood according to specific conditions.

In the description of the present invention, it should be noted that directions or positional relationships indicated by terms such as "central", "on", "under", "left", "right", "vertical", "horizontal", "in", "out" and the like are those shown based on the accompanying drawings, are merely intended to facilitate and simplify description rather than indicate or imply that the indicated device or element must have a specific direction and be structured and operated according to the specific direction, and should not be construed as limiting the present invention. In addition, the terms "first", "second" and "third" are used herein for descriptive purposes only and should not be construed as indicating or implying relative importance.

In the several examples provided in the present application, it should be understood that the disclosed system, device and method may be implemented in other ways. The examples of the aforementioned device are merely illustrative. For example, the division of the units is only a division based on logical function, and it can be implemented in other ways in actual situation. For another example, multiple units or components may be combined or integrated into another system, or some features may be omitted or not implemented. In addition, the shown or discussed coupling or direct coupling or communicative connection between each other may be through some communicative interfaces, and indirect coupling or communicative connection between devices or units may be in an electrical, mechanical or other forms.

The units described as separate components may or may not be physically separated, and components displayed as units may or may not be physical units; i.e. they may be located in one position, or may be distributed on multiple network units. Some or all of the units can be selected according to actual needs to achieve the purpose of the schemes of the examples.

In addition, each functional unit in each example of the present invention may be integrated in one processing unit, or each unit may physically exist alone, or two or more than two units may be integrated in one unit.

Taking the aforementioned ideal examples of the present invention as an inspiration and according to the aforementioned description, various changes and modifications can be made by related workers without deviating from the scope of the technical idea of the present invention. The technical scope of the present invention is not limited to the content of the specification, and must be determined according to the scope of the claims.

What is claimed is:

1. A filling material imprinted with a casting structure of a molecule of a decomposition product of an electrolytic copper foil additive, comprising the following raw materials:
    ferric chloride hexahydrate: 3 g;
    an imprinted molecule: 0.15 g-3 g;
    N',N-dimethylformamide: 60 g;
    2-aminoterephthalic acid: 1 g; and
    a porous ceramic: 6 g-30 g;
    wherein the imprinted molecule is the molecule of the decomposition product of the electrolytic copper foil additive.

2. A method for preparing the filling material according to claim 1, comprising the following reaction steps:
    step S01: dissolving the ferric chloride hexahydrate and the imprinted molecule in water to form a reaction solution;
    step S02: adding the N',N-dimethylformamide to the reaction solution and stirring for a first dissolution;
    step S03: adding the 2-aminoterephthalic acid to the reaction solution and stirring for a second dissolution;
    step S04: soaking the porous ceramic into the reaction solution and stirring; and
    step S05: treating the reaction solution by a hydrothermal method to remove a molecule of an additive decomposition product and prepare the filling material imprinted with the casting structure of the molecule of the decomposition product.

3. The method for preparing the filling material according to claim 2, wherein the step S05 comprises:
    step S05.1: pouring the reaction solution stirred in the step S04 into a polytetrafluoroethylene-lined bottle, transferring the reaction solution into a reactor, and placing the reactor in a blast air oven for a reaction;
    step S05.2: cooling the reaction solution after the reaction is completed, taking out the reaction solution for a centrifugation, discarding a supernatant, and collecting a product;
    step S05.3: performing a primary washing of the product with the N',N-dimethylformamide to remove an uncoordinated reaction precursor;
    step S05.4: performing a secondary washing of the product with methanol to remove the imprinted molecule, the additive decomposition product, in the product; and
    step S05.5: centrifuging and collecting the product after the primary washing and the secondary washing, and drying the product under a vacuum to obtain the filling material imprinted with the casting structure of the molecule of the decomposition product.

4. The method for preparing the filling material according to claim 2, wherein
    a mass percentage concentration of the 2-aminoterephthalic acid, the ferric chloride hexahydrate, the N',N-dimethylformamide, and the water in a preparation process of the filling material is:
    the 2-aminoterephthalic acid:the ferric chloride hexahydrate:the N',N-dimethylformamide:the water=1:3:60:200.

5. The method for preparing the filling material according to claim 2, wherein
    a method for preparing the imprinted molecule comprises:
    preparing a mixed solution containing an additive and a concentrated sulfuric acid;
    placing two pieces of materials not participating in an electrolysis reaction as an anode and a cathode in the mixed solution;
    electrolyzing the mixed solution to form an electrolyzed solution; and
    neutralizing the electrolyzed solution with an NaOH solution, and extracting with an organic solvent acetone to obtain the imprinted molecule.

6. The method for preparing the filling material according to claim 2, wherein
    the porous ceramic is one of an alumina porous ceramic, a zirconia porous ceramic, and an aluminum nitride porous ceramic.

7. The method for preparing the filling material according to claim 2, wherein
    the porous ceramic has a particle size of more than 100 μm and less than 1000 μm.

8. A method for preparing an electrolytic copper foil for a high-frequency signal transmission, comprising the following steps:
    connecting an additive decomposition product adsorption column with an electrolytic cell; and
    filtering a copper electrolyte solution in the electrolytic cell by using the additive decomposition product adsorption column to remove an additive decomposition product in the copper electrolyte solution and retain an additive so as to prepare the electrolytic copper foil for the high-frequency signal transmission;
    wherein the additive decomposition product adsorption column comprises:
    a glass tube to contain a filling material; and
    two pieces of mesh nylon, both set in the glass tube to plug two ends of the filling material;
    wherein the filling material is prepared by the method according to claim 2.

* * * * *